United States Patent [19]
Taggart et al.
[11] 3,893,173
[45] July 1, 1975

[54] MINIATURIZED MAGNETIC CARD READER/RECORDER FOR USE IN HAND-HELD CALCULATOR

[75] Inventors: Robert B. Taggart, Mountain View; Richard H. Barth, San Jose; John S. Bailey, Sunnyvale, all of Calif.

[73] Assignee: Hewlett-Packard Company, Palo Alto, Calif.

[22] Filed: Jan. 11, 1974

[21] Appl. No.: 432,710

[52] U.S. Cl. .......................... 360/60; 360/2; 360/88; 235/61.11 C
[51] Int. Cl.² ...................... G11B 19/04; G06K 7/08
[58] Field of Search ............... 360/2, 60, 61, 62, 71, 360/88; 235/61.11 C

[56] References Cited

UNITED STATES PATENTS

| | | | |
|---|---|---|---|
| 3,626,158 | 12/1971 | Lawrence | 360/88 |
| 3,780,377 | 12/1973 | Osgood | 360/2 |

FOREIGN PATENTS OR APPLICATIONS

| | | | |
|---|---|---|---|
| 1,220,062 | 1/1971 | United Kingdom | 235/61.11 C |
| 708,486 | 4/1965 | Canada | 235/61.11 C |
| 1,091,656 | 10/1960 | Germany | 235/61.11 C |

OTHER PUBLICATIONS

IBM Technical Disclosure Bulletin – Vol. 10, No. 11, Apr. 1968, pp. 1738–1739.

*Primary Examiner*—James W. Moffitt
*Attorney, Agent, or Firm*—F. David LaRiviere

[57] ABSTRACT

A miniaturized card reader/recorder is specified which is activated by the thickness of the card itself and in which actuating mechanism the card is simultaneously conformed to the contour of the magnetic read/record head.

7 Claims, 6 Drawing Figures

MINIATURIZED MAGNETIC CARD READER/RECORDER FOR USE IN HAND-HELD CALCULATOR

BACKGROUND OF THE INVENTION

To date the sophistication of hand-held calculators has been limited by the number and kind of calculations and mathematical operations which can be incorporated into the small-size package. Prior art calculators could not incorporate programming capability without sacrificing small size, since the subsystems required to input and store data and programming instructions comprise macro-components or a large number of micro-miniature components.

SUMMARY OF THE INVENTION

In the preferred embodiment of the present invention, the leading edge of a thin card containing magnetic recording media engages switch actuating balls which deflect pliant switch members into contact with printed circuit board (PCB) connection points to energize the card drive mechanism, activate a file protect circuit and enable the magnetic read/record head. As the card proceeds along the card guide, one of the switch actuation balls cause it to be urged into frictional engagement with the drive roller of the card drive mechanism. Other switch actuation balls cause the card to be wrapped or deformed to conform to the rounded contour of the magnetic head, which is necessary for reliable, high-density recording of digital data. Switch members remain in contact with the PCB connection points in response to the thickness dimension of the card for as long as the card is wedged or moving between the switch actuation balls and the card guide surface.

One object, therefore, of this invention is to provide a reliable, miniature, multi-function switching mechanism.

Another object of this invention is to provide a miniature magnetic card reader/recorder, suitable for use in handheld programmable calculators in which the drive mechanism and other electronic circuitry are activated by the thickness dimension of the card.

A still further object of the present invention is to provide compact switch actuators which also function to enhance the frictional engagement of one surface of a magnetic card with a drive roller and to retain one surface of a magnetic card to the contour of a magnetic read/record head as it passes thereby.

DESCRIPTION OF THE PREFERRED EMBODIMENT

Figure 1:
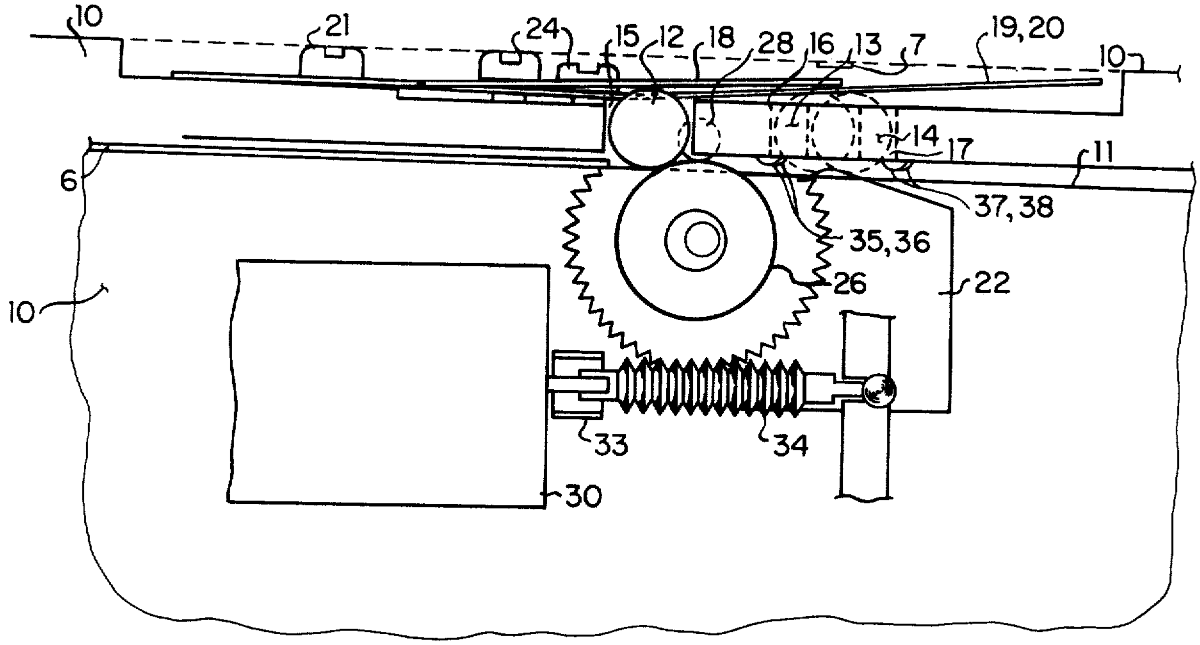
FIG. 1 is a cross-sectional view of the preferred embodiment of the card reader/recorder of this invention.
Figure 2:
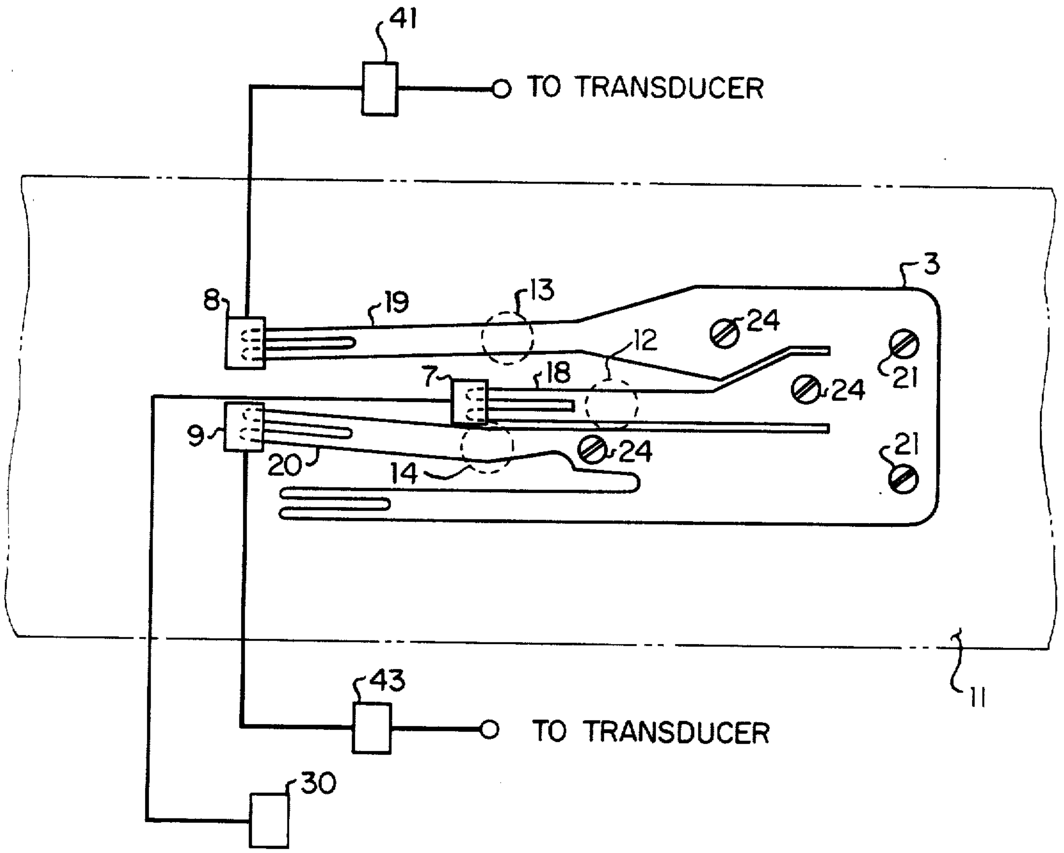
FIG. 2 is a top view of a thin sheet of electrically conductive material formed to have pliant switch members for use in the card reader/recorder of FIG. 1.
Figure 3A:
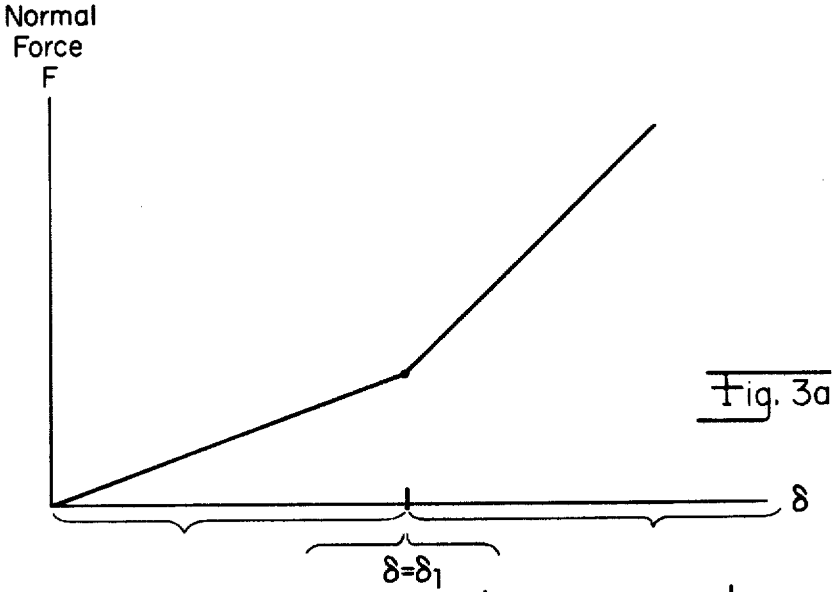
FIGS. 3a through d graphically and pictorially illustrate the characteristic of the force acting perpendicularly on the card via the ball in the card reader/recorder of FIG. 1.
Figure 3B:
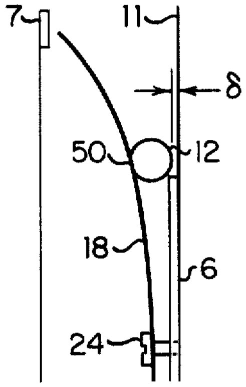
Figure 3C:
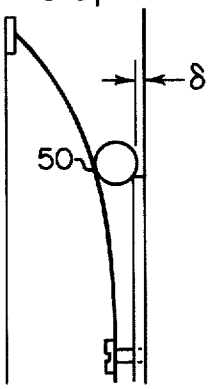
Figure 3D:
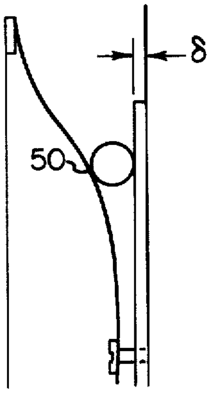

FIG. 1 shows the preferred embodiment of this invention in cross-section. Chassis 10, through which card 6 passes along card guide 11, houses switch actuating balls 12, 13 and 14 which are retained as shown in holes 15, 16, 17 respectively by the compression force developed thereon by pliant switch members 18, 19, and 20, respectively. Switch members 18, 19 and 20 are part of a thin sheet of electrically conductive material 3 formed substantially as shown in FIG. 2. Conductive sheet 3 is held in place on chassis 10 by mounting screws 21 and adjusting screws 24. Drive roller 26 and idler 28 are disposed at a location along guide 11 to receive card 6 so that drive roller 26 frictionally engages the surface containing magnetic recording media and idler 28 engages the inactive surface of the card. Magnetic read/write head 22 is mounted in chassis 10 such that the active portion of the head intersects a surface of card 6 containing magnetic recording media as it transverses card guide 11.

In operation, as card 6 is inserted into card guide 11, it first engages switch actuation ball 12 which, by wedging between ball 12 and the surface of path 11, is displaced against switch member 18. Such wedging action is facilitated by the stiffness of card 6 and by the fact that ball 12 is free to roll in hole 15. The ball is formed of an electrically insulating, substantially frictionless material such as nylon to permit a slippery engagement with the card in the event it does not roll. While ball 12 need not be electrically insulating, balls 13 and 14 are so insulating to reduce stray electrical grounding paths. The end of switch member 18 contacts PCB connection point 7 to complete a circuit which energizes the card drive mechanism comprising motor 30, worm gear 34, coupler 33, drive roller 26, and idler 28. As will be shown later in this specification, the switch contact is a sliding action which enhances the reliability of the electrical connection.

Card 6 is driven along guide 11 by the pinch-roller action of drive roller 26 cooperating with idler 28 on the card. As card 6 thus advances along guide 11, it engages switch actuation ball 13 which is displaced against switch member 19. Such engagement is achieved by substantially the same wedging action described above for ball 12, except for the presence of head 22 and the effects of protuberances 35 and 36 discussed later in this specification. The end of switch member 19 contacts another PCB connection point 8 (refer to FIG. 2) to complete a circuit which activates a file protect circuit 41. The file protect circuit is operative to electrically deactivate the record mode of magnetic head 22 when a portion of the leading edge of card 6, including one corner, is removed. Deactivation of head 22 prevents unitentional obliteration of prerecorded information on card 6. This file protect system is similar to that described in U.S. Pat. No. 3,780,377 entitled CARD READER-RECORDER APPARATUS WITH PROVISION FOR AVOIDING UNDESIRED ERASURES, issued to Richard B. Osgood on Dec. 18, 1973.

As card 6 is driven further along guide 11 by the drive mechanism, it engages switch actuation ball 14. By the same wedging action described above for ball 13, ball 14 is displaced against switch member 20, the end of which contacts a third PCB connection point 9 (refer to FIG. 2). Such contact by switch member 20 powers circuit 43 which enables the record mode of magnetic head 22 unless the file protect circuit has been activated.

Referring again to FIG. 1, in addition to displacing switch member 18, switch actuation ball 12 also enhances the frictional contact of a major surface of card 6 with drive roller 26 by transmitting the compression force developed thereon by switch member 18 to the other major surface of the card. Similarly, switch actuation balls 13 and 14, in cooperation with the four protuberances 35, 36, 37 and 38, also conform card 6 to the rounded contour of head 22 as it passes thereby. If any of the balls or protuberances engage card 6 with too much force, the drive mechanism will be overloaded. Therefore, the protuberances are smooth and rounded, and all switch actuation balls are permitted to rotate in order to reduce drag forces acting on the card as it is driven along guide path 11 by the drive mechanism. Furthermore, while adjusting screws for each switch member such as 24 are primarily for adjusting the distance through which the end of the switch members deflect before contacting the PCB connection point, their setting secondarily affects the amount of force exerted on the balls by such switch members.

The amount of force developed by switch members 18, 19 and 20 on balls 12, 13 and 14 respectively is more directly a function of switch member design. The magnitude of that force acting normal to the surface of card 6 via the switch actuation balls prior to contact of switch member with the PCB connection point may be approximated by the relation $$F = \frac{bh^3 E\delta}{4\,a^3}$$

where $b$ = width of switch member, $h$ = thickness of switch member, $E$ = elastic modulus of the switch member material, $\delta$ = displacement of actuation ball, and $a$ = effective distance from actuation ball to the base of of the switch member.

This approximation assumes a uniform width, b, of the switch member along its entire length. After the end of the switch member contacts the printed circuit board connection point, the magnitude of force changes, substantially in accordance with the relation $$F = \frac{bh^3 E}{a^3}\left[\frac{l^3(\delta-\delta_1)}{(l-a)^2(4l-a)} + \frac{\delta 1}{4}\right]$$

where $\delta_1$ = displacement of the ball necessary to make switch member contact printed circuit board connection point, and $l$ = total effective length of switch member.

FIGS. 3*a–d* graphs the force characteristics given by the above equations respectively as a pictorial function of ball displacement for uniform width *b*.

From the above equations it can be seen that the perpendicular force acting on the card increases after the end of the switch member contacts PCB connection point. Excessive increase of force is undesirable in the preferred embodiment of the invention because it tends to introduce perturbations in the smooth movement of the card in the drive mechanism which perturbations cause unreliable recording and reading of data on the card. Since the locations of the switch actuation ball and the length of the switch member are determined by overall size constraints for the calculator, the width b of the switch members is the simplest parameter to control for production purposes. Width b, if varied along the length of the switch member, also affects the travel of the contact end thereof for the same ball displacement. As shown in FIG. 3, the width of the switch members is generally more uniform from the point of contact 50 with the actuation ball to the contact end than from point 50 to adjusting screws 24. The width can actually be narrower in the region nearest the adjusting screw. Accordingly, the switch members are designed to deflect against the PCB connection points with sufficient force to assure electrical contact without causing force F acting on the actuation balls to overload the drive mechanism.

As can also be seen in FIG. 3, the shape of each switch member changes as it is deflected into contact with the PCB connection point. The end of the switch member tends to slide longitudinally, as it makes contact with the PCB connection point. Such sliding contact is generally regarded as providing greater connection reliability, since dirt and other foreign matter which may come between the two electrical contacts will be "rubbed away."

The deflection of the contact end of each resilient switch member in response to the displacement of the actuation balls is a function of the length of the member, placement of the actuation ball and the setting of the adjusting screw. To a lesser extent, it is also dependent on the shape of the member. Owing to packaging and electrical design constraints, the length of each switch member varies as shown in FIG. 2. Since the same card is used to displace all of the actuation balls through the same distance, the deflection at the contact end of the switch members would also vary unless otherwise controlled. Deflection in the preferred embodiment of the invention is controlled by appropriate placement of the balls along the switch member and adjustment of the adjusting screws with respect to the contact end thereof. Thus, the amount of contact end deflection can be made nearly the same irrespective of the length of the member. For a nominal actuation ball displacement of 0.008 inches, the contact end of the switch members deflect approximately 0.025 inches.

We claim:

1. An electromechanical apparatus for operation with a record card having major surfaces separated by a selected thickness dimension which is very much smaller than the width or length dimension thereof, said apparatus comprising:

chassis means including a guide path for receiving and guiding the record card along a selected path;

drive means disposed at a location along the guide path for moving the record card by frictional engagement therewith along the guide path in response to an electrical signal applied thereto;

electrical means including a resilient elongated first switch member disposed to be deflected to connect to an electrical connection point for applying an electrical signal to said drive means;

first switch member deflecting means positioned at a selected location in the guide path and coupled to the first switch member for deflecting the first switch member as a function of the thickness of the record card to contact said electrical connection point and for simultaneously urging a major surface of the record card into frictional engagement with the drive means;

transducer means disposed at a location along the guide path having a contoured surface for operative engagement with a major surface of the record card; and contour means disposed at a location along the guide path substantially opposite the contoured surface of the transducer means for deforming a major surface of the record card to conform to the contoured surface of said transducer means.

2. The electromechanical apparatus as in claim 1 further including first circuit means coupled to the transducer means for enabling that means wherein the electrical means includes a resilient elongated second switch member coupled to a second switch member deflecting means for deflecting that switch member as a function of the thickness of the record card to connect to a second electrical connection point for activating the first circuit means.

3. The electromechanical apparatus as in claim 1 further including first and second circuit means coupled to the transducer means for enabling and disabling, respectively, that means wherein the electrical means includes resilient elongated second and third switch members coupled to second and third switch member deflecting means, respectively, for deflecting those switch members, respectively, as a function of the thickness of the record card to connect to second and third electrical connection points, respectively, for activating the first and second circuit means, respectively.

4. The electromechanical apparatus as in claim 2 wherein the contour means includes the second switch member deflecting means positioned at a location in the guide path substantially at the contoured surface of the transducer means for simultaneously urging a major surface of the record card against the contoured surface of the transducer means.

5. The electromechanical apparatus as in claim 3 wherein the contour means includes the second and third switch member deflecting means positioned at a location in the guide path substantially at the contoured surface of the transducer means for simultaneously urging a major surface of the record card against the contoured surface of the transducer means.

6. An electromechanical apparatus as in claim 1 wherein:

the chassis means includes input and output ports located at opposite ends of the guide path for receiving and discharging a record card, respectively;

the drive means is located intermediate the input and output ports;

the transducer means is located intermediate the drive means and output port;

the first switch member deflecting means is positioned adjacent to the drive means in close proximity thereto for enhancing the frictional engagement thereof with a record card; and the contour means includes a second and a third switch member deflecting means positioned at the contoured surface of the transducer means and a plurality of protuberances disposed at a location along the guide path substantially opposite the contoured surface of the transducer means and distributed on both sides of the second and third switch member deflecting means for cooperating therewith to conform a major surface of the record card substantially to the contour of said transducer means.

7. An electromechanical apparatus as in claim 6 wherein:

the first, second and third switch member deflecting means are spherically shaped having a smooth surface for engaging the record card therewith;

the protuberances are roundly extended portions of the chassis means, and equally distributed on both sides of the second and third switch member deflecting means along the guide path.

* * * * *

UNITED STATES PATENT OFFICE

CERTIFICATE OF CORRECTION

Patent No. 3,893,173 Dated July 1, 1975

Inventor(s) Robert B. Taggart, Richard H. Barth, and John S. Bailey

It is certified that error appears in the above-identified patent and that said Letters Patent are hereby corrected as shown below:

Column 2, line 15, "transverses" should read -- traverses --; line 49, "unitentional" should read -- unintentional --;

Column 3, line 36, "of of" should read -- of --.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*